US012573851B2

(12) United States Patent
Wheatley

(10) Patent No.: US 12,573,851 B2
(45) Date of Patent: Mar. 10, 2026

(54) ELECTRIC VEHICLE (EV) CHARGING SYSTEM WITH DOWN-SUN WIND TURBINE

(71) Applicant: BEAM GLOBAL, San Diego, CA (US)

(72) Inventor: Desmond Wheatley, Rancho Santa Fe, CA (US)

(73) Assignee: BEAM GLOBAL, San Diego, CA (US)

( * ) Notice: Subject to any disclaimer, the term of this patent is extended or adjusted under 35 U.S.C. 154(b) by 0 days.

(21) Appl. No.: 17/081,419

(22) Filed: Oct. 27, 2020

(65) Prior Publication Data

US 2021/0126465 A1     Apr. 29, 2021

Related U.S. Application Data

(63) Continuation-in-part of application No. 16/665,851, filed on Oct. 28, 2019, now abandoned.

(51) Int. Cl.
*H02S 10/12*          (2014.01)
*B60L 53/51*          (2019.01)
(Continued)

(52) U.S. Cl.
CPC .............. *H02J 3/381* (2013.01); *B60L 53/51* (2019.02); *B60L 53/52* (2019.02); *F03D 9/007* (2013.01);
(Continued)

(58) Field of Classification Search
None
See application file for complete search history.

(56) References Cited

U.S. PATENT DOCUMENTS

| 4,418,684 | A | 12/1983 | Sanders |
| 5,315,227 | A | 5/1994 | Pierson |
| | | (Continued) | |

FOREIGN PATENT DOCUMENTS

| CN | 104613406 | 5/2015 |
| CN | 207571885 | 7/2018 |
| | (Continued) | |

OTHER PUBLICATIONS

PCT/US2020054922 International Search Report and Written Opinion, Mar. 18, 2022, ISA/US.
(Continued)

*Primary Examiner* — Dustin Q Dam
(74) *Attorney, Agent, or Firm* — Pauley Erickson & Swanson

(57) ABSTRACT

A system and method for collecting renewable energy includes a solar panel and a down-sun wind turbine that are mounted on a same crossbeam. In this combination, as the crossbeam is rotated on a support pole, the solar panel is simultaneously rotated through a directional arc θ and an inclination arc Φ in accordance with a predetermined daily schedule that is based on the time of day and the latitude of the system. Also, as the solar panel is moved, the wind turbine is free to follow wind direction and maximize its collection of wind energy. To further maximize the energy collection capability of the system, the wind turbine is located on the crossbeam to remain down-sun from the solar panel and to remain free from wind flow interference that may be caused by the solar panel.

20 Claims, 4 Drawing Sheets

(51) Int. Cl.

| | |
|---|---|
| *B60L 53/52* | (2019.01) |
| *F03D 9/00* | (2016.01) |
| *H02J 3/38* | (2006.01) |
| *H02J 7/35* | (2006.01) |
| *H02S 20/30* | (2014.01) |
| *F03D 1/00* | (2006.01) |

(52) U.S. Cl.
CPC ................ *H02J 7/35* (2013.01); *H02S 10/12* (2014.12); *H02S 20/30* (2014.12); *F03D 1/00* (2013.01); *F05B 2220/708* (2013.01); *H02J 2300/22* (2020.01); *H02J 2300/28* (2020.01)

(56) References Cited

U.S. PATENT DOCUMENTS

| | | | |
|---|---|---|---|
| 7,705,277 | B2 | 4/2010 | Noble |
| 8,648,551 | B2 | 2/2014 | Noble |
| 9,209,648 | B2 | 12/2015 | Wheatley |
| 10,518,657 | B2 | 12/2019 | Wheatley et al. |
| 2007/0246095 | A1 | 10/2007 | Schaefer |
| 2008/0037243 | A1 | 2/2008 | Discoe |

| | | | | |
|---|---|---|---|---|
| 2009/0050194 | A1 | 2/2009 | Noble | |
| 2012/0141266 | A1* | 6/2012 | Smyth .................... | F03D 13/20 |
| | | | | 415/213.1 |
| 2012/0261926 | A1* | 10/2012 | Van Den Bulcke ...... | F03D 9/35 |
| | | | | 290/55 |
| 2013/0037080 | A1 | 2/2013 | Helfan | |
| 2013/0127395 | A1 | 5/2013 | Santos Silva Serra Duarte | |
| 2017/0174090 | A1 | 6/2017 | LaKamp | |
| 2017/0324896 | A1 | 11/2017 | Gharabegian | |
| 2019/0013776 | A1* | 1/2019 | Tuli ........................ | H02S 20/10 |

FOREIGN PATENT DOCUMENTS

| | | |
|---|---|---|
| CN | 109377773 | 2/2019 |
| KR | 100966026 | 6/2010 |
| KR | 10-1262995 | 5/2013 |
| KR | 101851763 | 4/2019 |

OTHER PUBLICATIONS

European Patent Office, Extended Search Report, EP21887179, Oct. 18, 2024, Munich Germany.

* cited by examiner

ELECTRIC VEHICLE (EV) CHARGING SYSTEM WITH DOWN-SUN WIND TURBINE

This application is a continuation-in-part of application Ser. No. 16/665,851, filed Oct. 28, 2019, which is currently pending. The contents of application Ser. No. 16/665,851 are incorporated herein by reference.

FIELD OF THE INVENTION

The present invention pertains generally to an apparatus, systems and methods which collect electric energy for commercial use from sources, such as solar arrays, wind turbines, and the public grid. In particular, the present invention pertains to an apparatus that includes, in combination, a solar panel and a wind turbine that operate collectively without interfering with each other and their respective operations. The present invention is particularly, but not exclusively, useful as an apparatus for harvesting renewable energy from both a solar panel and a wind turbine, which are respectively oriented on the apparatus with the wind turbine positioned down-sun from the solar panel, to avoid interference from the wind turbine with sunlight incident on the solar panel, and to minimize a wind block condition for the wind turbine caused by the solar panel.

BACKGROUND OF THE INVENTION

There are many circumstances wherein it is desirable to have a source of electricity that may not otherwise be available. Indeed, this may be the case for any of several different reasons. When renewable energy sources are to be used, factors such as location, climatic conditions, accessibility and costs, are important considerations for determining how best to provide for the source of electricity.

In recent years, the availability of renewable energy sources has provided a great deal of flexibility for determining how to extend the availability of electrical sources. For example, wind energy and solar energy systems can be more localized and more mobile than other sources of electrical energy. Accordingly, these sources of renewable energy are being effectively commercially exploited.

With specific focus on solar energy and wind energy as sources of renewable energy, it is clear that the devices which rely on these different meteorological phenomena are structurally different and they have different capabilities. Importantly, although these phenomena are mutually exclusive for the respective operations, their outputs are cumulative. The consequence here is that when employed together, each energy source can operate independently and the combined effect of the different devices (i.e. wind and solar) can continue to generate electric power over an extended daily duty cycle. Thus, as a practical matter, it may be desirable to integrate these devices for their deployment. Further, it may be desirable to integrate the combination of wind and solar devices with the public grid, if available.

In order to optimize an integrated wind/solar electricity generator it is necessary that the respective operational capabilities of the generators be compatible with each other. Specifically, their respective operations should not interfere with the natural phenomenon that is the source of the other's operation. For instance, the solar generator (e.g. a solar panel) must never be in the shade of the wind generator. Stated differently, the wind generator must remain "down-sun" from the solar generator. On the other hand, the wind generator must be located sufficiently "down-wind" from the solar generator so that the solar generator will not operationally interfere with the wind generator.

In light of the above it is an object of the present invention to provide an integrated system which employs the combination of a wind generator with a solar generator for the generation of electricity. Another object of the present invention is to provide an integrated system for collecting solar energy and wind energy that allows the solar energy component (e.g. a solar panel) to be continuously oriented relative to the path of the sun. Still another object of the present invention is to provide an integrated system wherein a solar energy component and a wind energy component are mounted together as a same structural assembly for independent, non-interfering operations. Yet another object of the present invention is to provide an apparatus for harvesting renewable energy from both a solar panel and a wind turbine, which are respectively oriented on the apparatus with the wind turbine positioned down-sun from the solar panel, to avoid interference from the wind turbine with sunlight incident on the solar panel, and to minimize a wind block, condition for the wind turbine caused by the solar panel. Another object of the present invention is to provide an integrated wind/solar electricity generator which can be connected with the public grid for a combined use of the different sources of energy. Yet another object of the present invention is to provide an integrated solar/wind energy generator system that is simple to use, easy to manufacture and comparatively cost effective.

SUMMARY OF THE INVENTION

The present invention is a renewable energy system that employs devices which, in combination, generate electricity from both solar energy and wind energy. As an integrated system, the present invention is created as a compact unit that can either be permanently installed at a specific location, be connected to operate with a public grid, or be constructed as a mobile unit, that can be periodically repositioned as desired or required. For either embodiment, (permanent or mobile) it is an important feature of the present invention that the solar component and the wind component be independently operable. Further, it is important that these components not interfere with each other's operation.

Structurally, the system (i.e. apparatus) for collecting and storing renewable energy in accordance with the present invention includes a support pole that defines a pole axis. An extension arm is mounted horizontally on the support pole, perpendicular to the pole axis of the support pole. Also, the extension arm is mounted for rotation on the support pole around the pole axis in a plane perpendicular to the pole axis.

A solar panel is mounted at one end of the extension arm for collecting solar energy. Preferably, the solar panel will have a plurality of photovoltaic cells that are mounted in an array on the solar panel. And it will be inclined at a variable angle $\Phi$ relative to the pole axis. More specifically, the solar panel is mounted on the extension arm for rotation to a predetermined angle $\Phi$ around a horizontal axis that is perpendicular to the extension arm and perpendicular to the pole axis. Additionally, a wind turbine is mounted at the other end on the extension arm for collecting wind energy. As so mounted, the wind turbine is free to rotate through an angle $\psi$ about an axis parallel to the pole axis.

The apparatus also includes a motor for rotating the extension arm, together with the solar panel and the wind turbine, through an azimuthal angle $\theta$, and for rotating solar panel through the predetermined angle $\Phi$. Both of these rotations are accomplished simultaneously in accordance with a predetermined schedule. Specifically, the import here is to maintain the solar panel oriented during a day for optimal absorption of solar energy. Within the combination of components mentioned above, the present invention includes a storage battery that is connected to both the solar panel and to the wind turbine to store the collected energy.

For an assembly of the system of the present invention it is to be appreciated that the solar panel has a weight $W_s$ and the wind turbine has a weight $W_w$. With this in mind, the extension arm will have a balance point between its first and second ends, where the weight of the wind turbine $W_w$, acting on the extension arm at a distance $d_w$ from the balance point, and with the weight of the solar panel $W_s$, acting on the extension arm at a distance $d_s$ from the balance point will counterbalance each other ($W_w d_w = W_s d_s$). Also, with a view toward preventing operational interference between the wind turbine and the solar panel, the wind turbine is preferably located at a vertical height $h_w$ above the extension arm. In particular, the height $h_w$, and the distances $d_w$ and $d_s$ are selected to position the wind turbine on the apparatus to avoid an interference by turbulent wind flow to the wind turbine that may be caused by the solar panel. As disclosed above, the position of the wind turbine on the extension arm is established so as to be down-sun, and out of the shade, from the solar panel.

Operationally, it is envisioned that the motor for rotating the extension arm and the solar panel will be programmed with a predetermined schedule that is based on the time of day and the path of the sun during the day. Accordingly, the angle θ is in a directional arc that extends between an initial angle $θ_i$ and a final angle $θ_f$. Also, the angle Φ is in an inclination arc that extends between an angle $Φ_1$ and $Φ_2$. As indicated, the directional arc $θ_i:θ_f$ and the inclination arc $Φ_1:Φ_2$ are established daily in accordance with the predetermined schedule.

In detail, for the predetermined schedule, $θ_i$ is established relative to sunrise on the day of operation, and $θ_f$ is established relative to sunset on the day of operation. Also, $Φ_1$ is established relative to sunrise and sunset on the day of operation and $Φ_2$ is established relative to midday on the day of operation. Further, the directional arc and the inclination arc are established relative to the latitude of the apparatus.

As noted above, the wind/solar electricity generator of the present invention can be connected with a public grid. If this is done, the present invention envisions that a storage battery can be controlled to collect and then distribute electric energy in accordance with a prioritized protocol. Specifically, electricity taken from the public grid is used only after electricity from the wind/solar generator has been used. On the other hand, if excess energy from the wind/solar generator is available, it can be sent to the public grid to provide additional revenue.

In addition to functional considerations for the present invention, it is also important to consider structural requirements that are necessary for its safe and efficient operation. Specifically, it is important to consider the relative locations for a solar panel and for a wind turbine, when mounted on a support structure. During daylight hours, it is particularly important for the wind turbine to remain down-sun from the solar panel. Thus, the arrangement of components (i.e. solar panel and wind turbine) must be located on the support structure so that the wind turbine never shades the solar panel. Stated differently, it is important that the wind turbine remains down-sun from the solar panel. Functionally, this is accomplished by simultaneously rotating the solar panel and the wind turbine through the azimuthal angle θ.

It is also important that the wind turbine be located sufficiently distant from the solar panel, to minimize the effect that wind block, i.e. wind turbulence caused by the solar panel, can have on an operation of the wind turbine. It is to be appreciated, however, that because the wind turbine will independently rotate through the angle ψ and into the wind, the wind block effect is a consideration only when the wind turbine is downwind from the solar panel. When the wind turbine is upwind from the solar panel, wind block is not a consideration. Nevertheless, even though it may be upwind from the solar panel, the wind turbine will still remain down-sun from the solar panel.

Additional important structural details for a system with a down-sun wind turbine involve weight and balance, and wind effect considerations. These considerations become particularly important for several configurations envisioned by the present invention when the solar panel and the wind turbine are mounted together on a same support structure for a combined operation. With this in mind, insofar as weight and balance considerations are concerned, for configurations wherein the wind turbine has a substantial weight $W_w$, it is important that the wind turbine and the solar panel counterbalance each other to the maximum extent possible. As indicated above, considerations of the potential wind-loads on the structure are also very important.

With specific regard to wind-loads, unlike the sun's location, which is always predictable, the wind's magnitude and direction can, and will, cause loads on a support structure that will vary considerably. Consequently, the flat plate area that is presented by the solar panel, into the wind, (i.e. the size of the solar panel) is an important engineering design consideration. So too is the distance between the solar panel and the wind turbine. In either case, depending on the wind's magnitude, and its direction, substantial forces can influence the structure supporting the solar panel and the wind turbine.

In an alternate embodiment for the present invention, when the wind turbine has a moderate weight, instead of employing an extension arm as disclosed above, a cantilever arm can be used. For this alternate embodiment, one end of the cantilever arm can be attached directly to the support pole with the solar panel, and the wind turbine can be mounted on the other end of the cantilever arm. In this alternate embodiment, the same down-sun condition is maintained as disclosed above, and the same wind block considerations are involved. Weight and balance considerations remain a structural consideration.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 413 is a schematic presentation of the components shown in FIG. 4A wherein dimensional separation between the solar panel and the wind turbine, as well as solar panel orientation, are shown as factors that affect wind block and wind turbulence interference for the wind turbine, caused by the solar panel;

DESCRIPTION OF THE PREFERRED EMBODIMENTS

Figure 1:
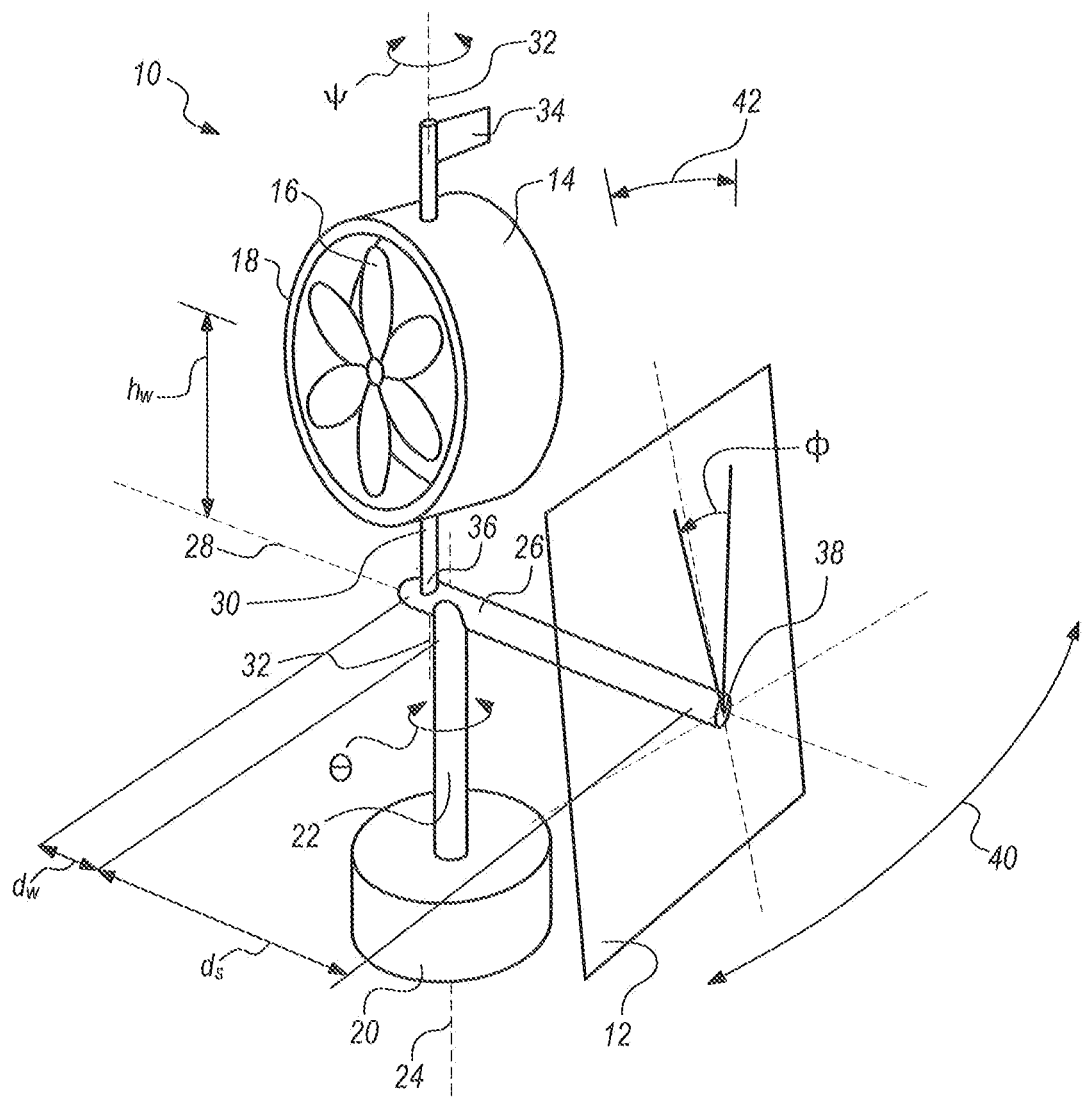
FIG. 1 is a perspective view of the apparatus of the present invention.

Referring initially to FIG. 1, an apparatus for collecting and storing renewable energy in accordance with the present invention is shown and is generally designated 10. As shown, the apparatus 10 includes both a solar panel 12 and a wind turbine 14. For the present invention, the solar panel 12 can be an array of photovoltaic cells that are presented in a manner well known in the pertinent art for the purpose of converting solar energy into electrical energy. The wind turbine 14 for the present invention is essentially a windmill 16 that may, or may not, be mounted in a shroud 18. For purposes of the present invention, the wind turbine 14 may be of any type well known in the pertinent art that is capable of converting wind energy into electrical energy.

Still referring to FIG. 1, it will be seen that the apparatus 10 includes a base 20 that stabilizes the apparatus 10. Mounted inside the base 20, or otherwise operationally connected with the apparatus 10, are a motor (not shown) and a storage battery (not shown). As intended for the present invention, the motor is used to reconfigure the apparatus 10 in a predetermined manner fully disclosed below. Also, the storage battery is provided to store the electrical energy generated by the solar panel 12 and/or the wind turbine 14. A portion of the electrical energy stored in the storage battery will be used to operate the apparatus 10. Excess electrical energy, however, may be used for other purposes as deemed necessary or appropriate.

Structurally, the apparatus 10 includes a support pole 22 which defines a pole axis 24. As intended for the present invention, the pole axis 24 will typically be vertically oriented. Mounted on the support pole 22 is an extension arm 26 which defines a horizontal axis 28. Further, mounted on the extension arm 26 is an elevation arm 30 that defines a vertical axis 32. In this combination, the extension arm 26 is perpendicular to the support pole 22, while the elevation arm 30 is parallel to the support pole 22 and perpendicular to the extension arm 26.

The structure for the apparatus 10 of the present invention also includes a weathervane 34 that is fixed on the shroud 18. In response to the reaction of the weathervane 34, the wind turbine 14 will be rotated around the vertical axis 32 through an angle $\psi$. Depending on wind direction, the wind turbine 14 can be rotated through a 360° arc.

During an assembly of the apparatus 10 several dimensions shown in FIG. 1 are of particular importance. In particular, these dimensions include: i) $h_w$, which is the height of the c.g. of the windmill 16 above the horizontal axis 28; ii) $d_w$, which is the distance of the vertical axis 32 from a balance point 36 on the pole axis 24; and iii) $d_s$, which is the distance between an attachment point 38 where the solar panel 12 is connected to the extension arm 26, and the balance point 36. In general, these dimensions are to be established with structural stability and operational capabilities of the apparatus 10 in mind.

For an operation of the apparatus 10, the motor (not shown) which is mounted in the support base 20 is programmed to rotate the extension arm 26 through a predetermined directional angle $\theta$. The motor is also programmed to rotate the solar panel 12 through a predetermined inclination angle $\Phi$. Both the rotation of the extension arm 26 and the rotation of the solar panel 12 are accomplished in accordance with a predetermined schedule.

Figure 2:
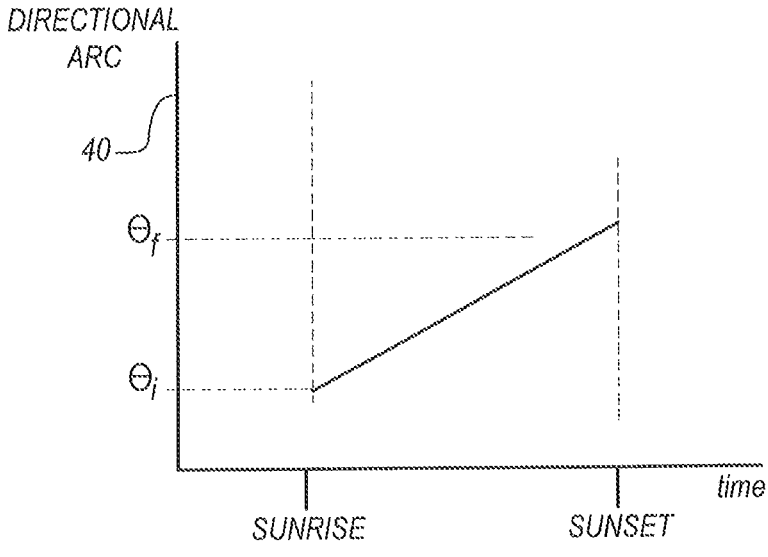
FIG. 2 is a graphical presentation of the directional arc $θ_i:θ_f$ envisioned for the present invention.

In detail, the extension arm 26 is rotated in a horizontal plane through a directional angle $\theta$ that is measured in a directional arc 40. More specifically, as seen in FIG. 1 and graphically presented in FIG. 2, the directional arc 40 extends between an initial angle $\theta_i$ and a final angle $\theta_f$ (i.e. $\theta_i{:}\theta_f$). In accordance with the predetermined schedule mentioned above, the initial direction angle $\theta_i$ is established daily relative to sunrise on the day of operation, and the directional angle $\theta$ steadily increases during the day until the final directional angle $\theta_f$ is established relative to sunset on the same day of operation. As will be appreciated by the skilled artisan the directional arc will be traversed each day, and the length of the directional arc 40 (i.e. $\theta_i{:}\theta_f$) will change from day to day.

Figure 3:
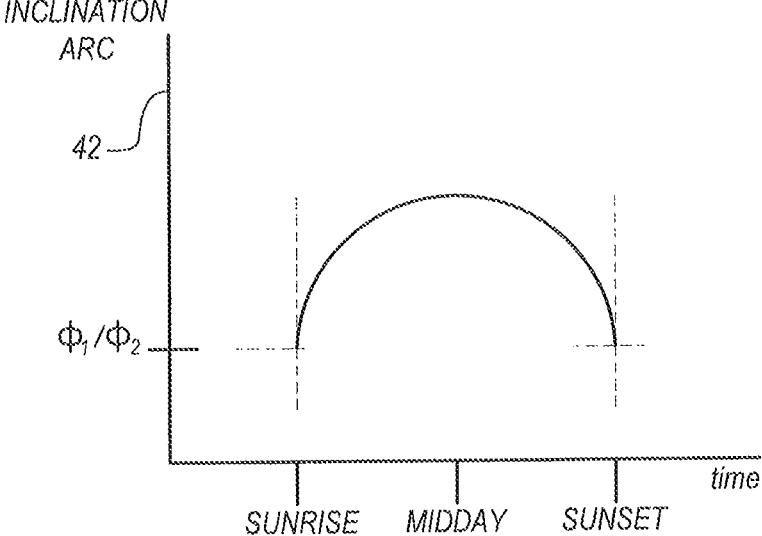
FIG. 3 is a graphical presentation of the inclination arc $Φ_1:Φ_2$ envisioned for the present invention.

As part of the predetermined schedule, the motor also rotates the solar panel 12. Specifically, for this rotation as shown in FIG. 1 and graphically presented in FIG. 3, the inclination angle $\Phi$ extends between an angle $\Phi_1$ and an angle $\Phi_2$ through an inclination arc 42 (i.e. $\Phi_1{:}\Phi_2$). Unlike the directional angle $\theta$, however, the inclination angle is measured in a vertical plane. Further, for the inclination arc 42, $\Phi_1$ is established daily relative to both sunrise and sunset on the day of operation. On the other hand, $\Phi_2$ is established relative to midday on the day of operation. Together, the directional arc 40 and the inclination arc 42 are established relative to the latitude of the apparatus 10. With the above in mind, it is to be remembered that the angle $\psi$ for rotation of the wind turbine 14 around the vertical axis 32 will extend through a 360° arc and is time independent.

For support and stability considerations concerning the present invention, the solar panel 12 will have a weight $W_s$ and the wind turbine 14 will have a weight $W_w$. Also, the extension arm 26 will have a balance point 36 between its end points. Importantly, the balance point 36 will be located on the support pole 22 with the weight $W_w$ of the wind turbine 14 acting on the extension arm 26 at a distance $d_w$ from the balance point 36. Also, the weight W of the solar panel 12 will be acting on the extension arm 26 at a distance $d_s$ from the balance point 36. In this combination $W_w$ and $W_s$ are to be counterbalanced (i.e. $W_w d_w{=}W_s d_s$).

The consequences of selecting appropriate dimensions for the above combination of structure include the fact that the wind turbine 14 will always be located down-sun from the solar panel 12. Also, the wind turbine 14 will be positioned on the extension arm 26 and located at a vertical height $h_w$ above the extension arm 26 to avoid an interference in wind flow through the wind turbine 14 that might otherwise be caused by turbulent airflow caused by the solar panel 12.

For an optional embodiment of the present invention the wind/solar electric generator can be somehow connected with a public grid. In particular, it is envisioned that a connection can be made directly with an existing public utility, such as a light post (not shown), or a commercially available grid outlet. In any event, electricity taken from a public grid will be prioritized with energy from the wind/solar electric generator so that energy collected from the wind/solar electric generator is used first. Also, excess energy can be returned to the grid for the purpose of generating revenue.

Figure 4A:
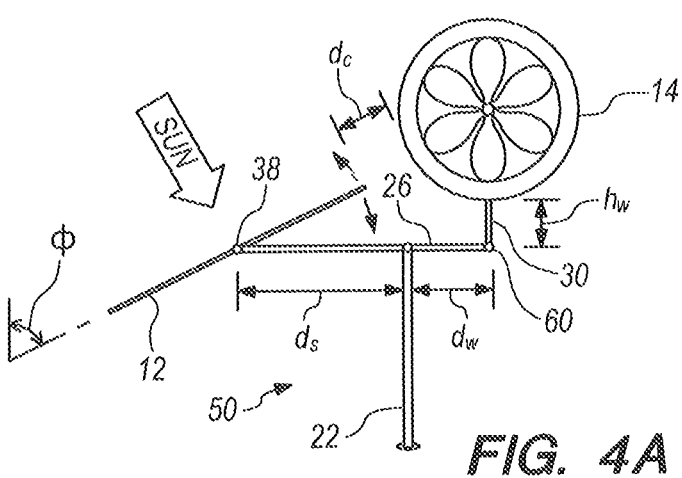
FIG. 4A is a schematic presentation of a side elevation view of components for the present invention, showing dimensional separations for minimizing interference by the wind turbine with the sunlight required for an operation of the solar panel (i.e. a down-sun configuration), and for simultaneously minimizing interference by the solar panel with the wind magnitude required for an operation of the wind turbine (i.e. wind block)
Figure 4B:
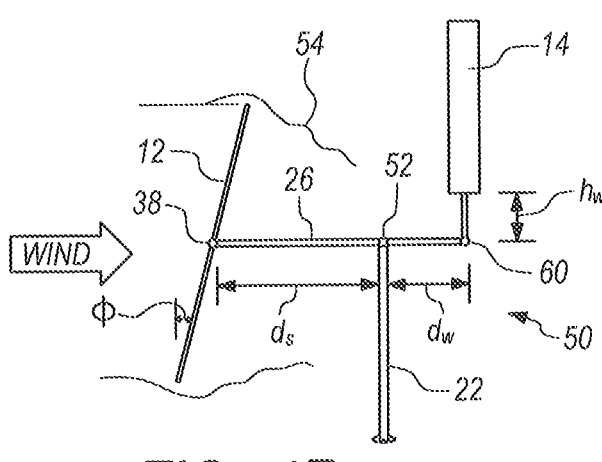
FIG. 4C is a schematic presentation of a top plan view of the components shown in FIG. 4A showing the range of wind directions, relative to the solar panel, that most directly affect wind block and wind turbulence conditions on an operation of the wind turbine.
Figure 4C:
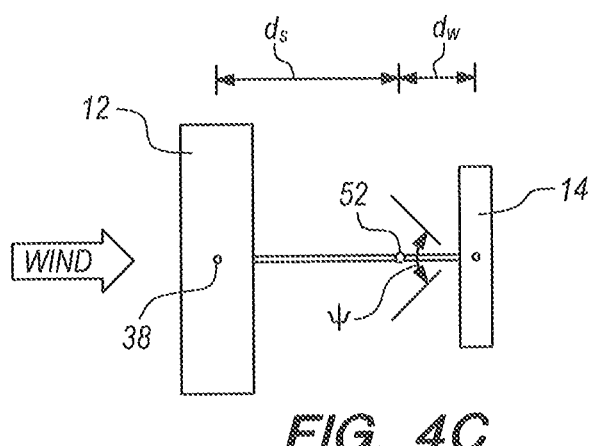

Additional features of the present invention are presented in FIGS. 4A-C for the purpose of disclosing the predominant environmental effects acting on a support structure 50 for the present invention. FIGS. 4A-C also disclose structural dimensions between components of the present invention which are provided to avoid adverse consequences that might otherwise be caused by the environmental effects. For purposes of this disclosure, it is to be appreciated that the environmental effects are caused principally by sun and wind conditions. Also, for disclosure purposes, the support structure 50 includes the elevation arm 30, and the support pole 22, and the extension arm 26 (sometimes also referred to herein as the "crossbeam").

With reference to FIG. 4A, it will be seen that the present invention intends for sunlight to always be incident on the solar panel 12 from a direction normal to the plane of the solar panel 12. Accordingly, as disclosed above, in order to maintain this condition, the solar panel 12 will need to be rotated and tilted throughout the day by simultaneously varying both the azimuthal angle θ and the inclination angle φ. These movements, however, can significantly affect the positional relationship between the solar panel 12 and the wind turbine 14. For example, compare the inclination angle φ of the solar panel 12 in FIG. 4A with its inclination angle φ in FIG. 4B.

Unlike the predictable movement of the sun, wind direction can, and will, vary. Again, compare FIG. 4A with FIG. 4B and the different orientations of the wind turbine 14. For this comparison, FIG. 4A depicts the wind turbine 14 oriented to benefit from a wind that is perpendicular to the plane of FIG. 4A. On the other hand, FIG. 4B depicts the wind turbine 14 oriented to benefit from a wind that is directed toward the wind turbine 14, parallel to the extension arm (crossbeam) 26. in the plane of FIG. 4A.

By comparing FIG. 4A with FIG. 4B, it will be appreciated theta combined consideration of inclination angle 4) and wind direction raises two separate, but related, issues: namely, down-sun considerations for positioning the wind turbine 14, and wind block considerations for the inclination of the solar panel 12.

With reference to FIG. 4A, it will be appreciated that the combined distance $d_s+d_w$ must always provide for a positive clearance distance $d_c$ between the wind turbine 14 and the solar panel 12. This will be the case under all wind conditions. It will also be appreciated that, despite a fixed structural connection between the support structure 50 and the support pole 22, an imbalance in moments around the fulcrum 52 could have a disastrous bending effect on the support pole 22. The respective distances $d_s$ and $d_w$ must therefore be established to counterbalance the solar panel 12 ($d_s$) with the wind turbine ($d_w$) around the fulcrum 52 at the top of the support pole 22.

With reference to FIGS. 4B and 4C, it will be seen that the combined distance $d_s+d_w$ must also accommodate variations in wind direction. A concern for the positioning of the wind turbine 14 relative to the solar panel 12 is essentially two-fold. For one, in addition to wind block by the solar panel 12, which may neutralize any beneficial wind effect, it is also desirable to minimize the effect that wind turbulence 54 caused by the solar panel 12 may have on the wind turbine 14. For another, it is necessary to consider wind direction. As will be appreciated with reference to FIG. 4C, any adverse effects that the solar panel 12 may have on the wind turbine 14 are minimal or are a non-factor when the wind direction is outside the ψ arc shown in FIG. 4C. Otherwise, adverse effects may be considerable.

Figure 5:
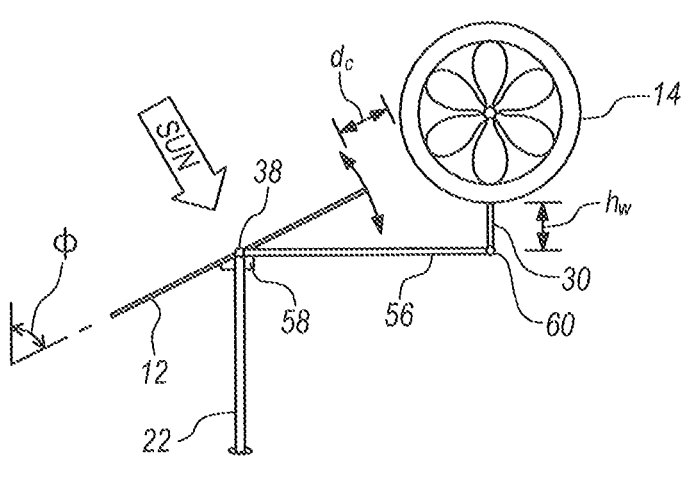
FIG. 5 is schematic presentation of a side elevation view for the present invention showing the wind turbine mounted on a cantilever for azimuthal rotation with the solar panel around a same support pole.

An alternate embodiment for the apparatus 10 of the present invention is shown in FIG. 5 where it will be seen that a cantilever 56 is used in place of the extension arm 26. Specifically, for this alternate embodiment, one end of the cantilever 56 is connected with a tracking mechanism 58, which is mounted on the support pole 22, while the other end 60 of the cantilever 56 supports the wind turbine 14. In this combination, wherein the tracking mechanism 58 is connected with the solar panel 12, the tracking mechanism 58 is operated to rotate the solar panel 12 and the cantilever 56, together, through the same azimuthal angle θ.

While the particular Electric Vehicle (EV) Charging System with Down-Sun Wind Turbine as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for generating renewable energy, the system comprising:
   a support base defining a support axis, wherein the support axis is vertical;
   an extension arm mounted to the support base, wherein the extension arm has an end extending outward from the support base, and the extension arm rotates about the support axis:
   a solar panel mounted to an attachment point at the end of the extension arm, wherein a first portion of the solar panel extends above the attachment point and the extension arm, a second portion of the solar panel extends below the attachment point and the extension arm, and the solar panel is rotatable through an inclination angle about the attachment point;
   a first motorized mechanism configured to rotate the extension arm about the support axis;
   a second motorized mechanism mounted at the end of the extension arm, and connected with the solar panel for rotating the solar panel through the inclination angle;
   a controller in combination with the first motorized mechanism and the second motorized mechanism, and the controller and the first motorized mechanism collectively configured to rotate the solar panel along a directional arc about the support axis to keep the solar panel facing a direction toward the sun; and
   a wind turbine mounted with respect to the extension arm and/or the support base, wherein the wind turbine rotates about a turbine axis that is parallel to the support axis, wherein the wind turbine also rotates around the support axis so that the wind turbine is and remains down-sun of the solar panel during a rotation of the solar panel along the directional arc to prevent the wind turbine from shading the solar panel, and the wind turbine is mounted above the support base and/or the solar panel whereby the solar panel does not block wind from contacting the wind turbine during the rotation along the directional arc.

2. The system of claim 1, wherein the wind turbine comprises a fixed weathervane, whereby wind contacting the weathervane rotates the wind turbine to face the wind.

3. The system of claim 1, further comprising a battery mounted to the support base and configured to power the first motorized mechanism and be recharged by the solar panel and/or the wind turbine.

4. The system of claim 1, wherein the controller rotates the solar panel and wind turbine assembly according to a predetermined schedule.

5. The system of claim 1, wherein the solar panel is tiltable through the inclination angle in a direction at an angle to the directional arc.

6. The system of claim 5, wherein the inclination angle is variable based upon a time of day, a date, and a latitude of the system, to maintain an incidence of sunlight on the solar panel from a direction perpendicular to the solar panel.

7. The system of claim 1, wherein the directional arc is based upon a date and a latitude of the system, to maintain the solar panel facing the direction toward the sun.

8. The system of claim 1, wherein the support base comprises a pole.

9. A system for generating renewable energy, the system comprising:

a support base defining a support axis;

an extension arm mounted to the support base, wherein the extension arm has a first end and a second end each extending outward from the support base and rotates about the support axis;

a solar panel mounted to an attachment point at the first end of the extension arm, wherein a first portion of the solar panel extends above the attachment point and the extension arm, a second portion of the solar panel extends below the attachment point and the extension arm, and the solar panel is rotatable through an inclination angle about the attachment point;

a first motorized mechanism configured to rotate the extension arm and the solar panel about the support axis;

a second motorized mechanism mounted at the attachment point, and configured to rotate the solar panel through the inclination angle;

a controller in combination with the first motorized mechanism and the second motorized mechanism, and the controller and the first motorized mechanism collectively configured to rotate the extension arm along a predetermined and limited directional arc about the support axis to keep the solar panel facing a direction toward the sun; and a wind turbine mounted at the second end of the extension arm, wherein the wind turbine rotates about the support axis, wherein the wind turbine is and remains down-sun of the solar panel during a rotation of the solar panel along the predetermined and limited directional arc, and the wind turbine is mounted vertically above the extension arm whereby the solar panel does not block wind from contacting the wind turbine.

10. The system of claim 9, wherein the extension arm is rotated in a horizontal plane.

11. The system of claim 9, wherein the extension arm comprises a crossbeam extending from two sides of the support base.

12. The system of claim 9, wherein the wind turbine comprises a fixed weathervane, whereby the wind contacts the weathervane to rotate the wind turbine to face the wind independently of the wind turbine rotation around the support axis.

13. The system of claim 9, further comprising a battery mounted to the support base and configured to power the first and second motorized mechanisms and be recharged by the solar panel and/or the wind turbine.

14. The system of claim 9, wherein the controller rotates the solar panel and wind turbine according to a predetermined schedule.

15. The system of claim 9, wherein the inclination angle is variable based upon a time of day, a date, and a latitude of the system, to maintain an incidence of sunlight on the solar panel from a direction perpendicular to the solar panel.

16. The system of claim 9, wherein the directional arc is variable and based upon a date and a latitude of the system, to maintain the solar panel facing the direction toward the sun.

17. The system of claim 9, wherein the support base comprises a pole.

18. The system of claim 17, wherein the support axis is vertical.

19. The system of claim 1, wherein the first portion of the solar panel tilts about the attachment point toward the extension arm and the support base.

20. The system of claim 1, wherein the solar panel is simultaneously rotated through the directional arc and the inclination angle by the controller in accordance with a predetermined daily schedule that is based on time of day and an installation latitude of the system.

* * * * *